(12) United States Patent
Esseling et al.

(10) Patent No.: US 11,913,909 B2
(45) Date of Patent: Feb. 27, 2024

(54) DEVICE AND METHOD FOR DETERMINING THE EXTENT OF DEFECTS BY MEANS OF V THROUGH-TRANSMISSION

(71) Applicant: ROSEN SWISS AG, Stans (CH)

(72) Inventors: Michael Esseling, Sudlohn (DE); Werner Thale, Wallenhorst (DE)

(73) Assignee: ROSEN Swiss AG, Stans (CH)

( * ) Notice: Subject to any disclaimer, the term of this patent is extended or adjusted under 35 U.S.C. 154(b) by 551 days.

(21) Appl. No.: 17/049,227

(22) PCT Filed: Apr. 12, 2019

(86) PCT No.: PCT/EP2019/059543
§ 371 (c)(1),
(2) Date: Oct. 20, 2020

(87) PCT Pub. No.: WO2019/201804
PCT Pub. Date: Oct. 24, 2019

(65) Prior Publication Data
US 2021/0255146 A1 Aug. 19, 2021

(30) Foreign Application Priority Data
Apr. 20, 2018 (DE) .......................... 1020181095740

(51) Int. Cl.
*G01N 29/11* (2006.01)
*G01N 29/04* (2006.01)
(Continued)

(52) U.S. Cl.
CPC ........... *G01N 29/11* (2013.01); *G01N 29/043* (2013.01); *G01N 29/221* (2013.01);
(Continued)

(58) Field of Classification Search
CPC ............... G01N 29/043; G01N 29/221; G01N 29/2487; G01N 29/265; G01N 29/28;
(Continued)

(56) References Cited

U.S. PATENT DOCUMENTS 2,799,157 A 7/1957 Pohlman
2,893,239 A 7/1959 Renaut
(Continued)

FOREIGN PATENT DOCUMENTS

DE 10202432 A1 8/2003
DE 10304270 A1 * 8/2004 ......... G01N 29/2412
(Continued)

OTHER PUBLICATIONS

Jennifer E Michaels et al: "An Ultrasonic Angle Beam Method for in situ Sizing of Fastener Hole Cracks", Journal of Nondestructive Evaluation, Luwer Academic Publishers-Plenum Publishers, NE, Bd. 25, Nr. 1, May 16, 2006.

*Primary Examiner* — Jacques M Saint Surin
(74) *Attorney, Agent, or Firm* — Husch Blackwell LLP

(57) ABSTRACT

Method is provided for determining the extent of defects, in particular of crack depths, in a test specimen. At least one transmitting transducer excites sound waves in the ultrasonic range, and the sound waves propagate in the form of a sound beam. The acoustic axis of the sound beam preferably forms an angle the normal to a surface of the test specimen facing the transmitting transducer. The sound waves couple into the test specimen obliquely and are reflected in particular in a V-shaped manner at a preferably outer interface of the test specimen. At least one receiving transducer spaced apart from the transmitting transducer receives the sound waves reflected at the interface of the test specimen. By means of an evaluation unit, an extent of a defect arranged within a sound path is determined from a reduction of the amplitude of the sound waves received by the receiving transducer. The
(Continued)

transmitting transducer and the receiving transducer are guided past the test specimen at an at least substantially constant distance therefrom, and the sound waves are coupled into the test specimen with an advance section via a liquid medium. A device for detecting signals based on defects in a test specimen is also provided.

22 Claims, 10 Drawing Sheets

(51) Int. Cl.
*G01N 29/22* (2006.01)
*G01N 29/24* (2006.01)
*G01N 29/265* (2006.01)

(52) U.S. Cl.
CPC ....... *G01N 29/2487* (2013.01); *G01N 29/265* (2013.01); *G01N 2291/0289* (2013.01); *G01N 2291/044* (2013.01); *G01N 2291/056* (2013.01)

(58) Field of Classification Search
CPC ........... G01N 29/11; G01N 2291/0289; G01N 2291/044; G01N 2291/102; G01N 2291/056; G01N 2291/2636
USPC .......................................................... 73/620
See application file for complete search history.

(56) References Cited

U.S. PATENT DOCUMENTS

| | | | | |
|---|---|---|---|---|
| 4,658,649 A * | 4/1987 | Brook | ................ | G01N 29/0618 73/598 |
| 5,125,272 A * | 6/1992 | Latimer | ................. | G01N 29/07 73/598 |
| 5,201,225 A | 4/1993 | Takahashi et al. | | |
| 7,240,556 B2 * | 7/2007 | Georgeson | ............ | G01N 29/041 73/620 |
| 7,823,451 B2 * | 11/2010 | Sarr | ...... | G01N 29/265 73/598 |
| 9,516,522 B1 * | 12/2016 | Hewitt | ............. | H04W 4/12 |
| 11,092,572 B2 * | 8/2021 | Samokrutov | ........ | G01N 29/449 |
| 2008/0148856 A1 | 6/2008 | Georgeson et al. | | |
| 2011/0239770 A1 | 10/2011 | Yamano et al. | | |
| 2018/0045680 A1 * | 2/2018 | Thompson | ......... | G01R 33/0011 |
| 2018/0328891 A1 * | 11/2018 | Giese | ................... | G01N 29/225 |

FOREIGN PATENT DOCUMENTS

| | | | | |
|---|---|---|---|---|
| DE | 69831423 T2 | 7/2006 | | |
| DE | 102005016631 B3 | 10/2006 | | |
| DE | 102012110917 A1 | 5/2014 | | |
| JP | 6073453 A | 4/1985 | | |
| JP | 4241529 B2 * | 3/2009 | | |
| WO | WO-2011063913 A2 * | 6/2011 | ............. | F16L 55/48 |

* cited by examiner

DEVICE AND METHOD FOR DETERMINING THE EXTENT OF DEFECTS BY MEANS OF V THROUGH-TRANSMISSION

CROSS REFERENCE

This application claims priority to PCT Application No. PCT/EP2019/059543, filed Apr. 12, 2019, which itself claims priority to German Application No. 10 2018 109574.0, filed Apr. 20, 2018, the entirety of both of which are hereby incorporated by reference.

FIELD OF THE INVENTION

The invention relates to a method for determining the extent of defects, in particular crack depths, in a test specimen, preferably a wall of a pipeline. In the method, sound waves in the ultrasonic range are excited by at least one transmitting transducer and propagate in the form of a sound beam, wherein the acoustic axis of the sound beam preferably forms an angle with the normal to a surface facing the transmitting transducer. The sound waves couple into the test specimen obliquely and are reflected in particular in a V-shaped manner at a preferably outer interface of the test specimen. In this case, the interface can form the outer surface of the test specimen. However, in the case of test specimens constructed from a plurality of layers composed of different materials, in particular, the corresponding interface can also be arranged within the test specimen. This is the case for example for a pipeline having a metallic core enclosed by a concrete cladding. The sound waves reflected at the interface of the test specimen are received by at least one receiving transducer spaced apart from the transmitting transducer. By means of an evaluation unit, an extent of a defect arranged within a sound path is determined from a reduction of the amplitude of the sound waves received by the receiving transducer. The evaluation unit can be present in part in a below-described device in the form of customary electrical and/or electronic means used for the evaluation of ultrasonic transducers; these means can also be present at least in part at a distance from the device.

Furthermore, the invention relates to a device for detecting signals based on defects in a test specimen.

BACKGROUND

A method of this type is known as V or W through-transmission from non-destructive material testing by means of ultrasonic technology and is used for example for testing weld seams. This involves the use of transmitting transducers and receiving transducers in the form of test heads that are placed directly onto the test specimen.

SUMMARY OF THE INVENTION

It is an object of the invention to make the method usable for the use of test specimens with large extents of their surface.

The object is achieved in that the transmitting transducers and the receiving transducers are guided past the test specimen at an at least substantially constant distance therefrom and the sound waves are coupled into the test specimen with an advance section via a liquid medium, a coupling medium. By virtue of the fact that transmitting transducers and receiving transducers are arranged at a distance from the test specimen, they can be guided along the test specimen without contact. In this case, the test specimen can be tested while transmitting transducer and receiving transducer are being moved past the test specimen. The method can be carried out with high reliability by means of the non-contact embodiment even in the case of test specimens having a very large extent, such as walls of a pipeline, for example. The receiving transducer and respectively the transmitting transducer are not exposed to mechanical loads and the associated wear, or are exposed thereto only to a greatly reduced degree. The method can thus be carried out for long periods of time or large test specimens without or only with short interruptions for maintenance and repairs.

The object is furthermore achieved by means of a device according to the invention according to claim 15.

Advantageous configurations of the invention can be gathered from the dependent claims that refer back to the independent claims, and from the following description.

The specimen that serves as test specimen for the method according to the invention preferably has surfaces which run parallel to one another and are planar disregarding possible defects or weld seams, which surfaces are at a small distance from one another in comparison with the extent of the test specimen. The transmitting transducer and also the receiving transducer can be configured as piezo-transducers. In this case, the piezoelectric elements of the transducer are deformed when a voltage is applied, or generate a voltage when they are deformed. As a result of the excitation of the piezoelectric element in a corresponding transmitting transducer with a sufficiently high frequency, the transmitting transducer excites sound waves in the medium passing around the transmitting transducer. The transmitting transducer is connected to the test specimen via a liquid medium, such that the technique can be used in particular in pipelines carrying liquids during the operation thereof. The ultrasonic waves excited in the medium impinge on the surface of the test specimen at an angle to the normal to the surface and couple into the test specimen in such a way that the sound waves pass through the test specimen obliquely. The sound waves are reflected at a preferably outer interface. The sound waves once again pass through the thickness of the test specimen and emerge again at the first interface at a distance from the entrance point. In this case, the emergence location is dependent on the angle at which the sound waves couple into the test specimen, and also on the thickness of the test specimen. The sound waves emerging from the test specimen once again couple into the medium and are received by a receiving transducer oriented towards at least part of the emergence point. Here the sound waves are converted into an electrical signal again. The receiving transducer is thus acoustically coupled to the test specimen via the coupling medium for the reception of sound waves. The distance between transmitting and receiving transducer and the test specimen is preferably between 0.5 cm and 5 cm.

While transmitting transducer and receiving transducer are guided past the test specimen without contact at a constant distance from one another, what happens in the case of defects is that the sound waves received by the receiving transducer have a reduced amplitude. The extent of the defect is determined therefrom in an evaluation unit.

For this purpose, it is assumed that the reduction of the amplitude of the sound waves received by the receiving transducer results from the fact that at a defect arranged within the sound path of the sound waves through the test specimen from the entrance point to the emergence point, at least some of the sound waves are reflected in a different direction with respect to the emergence point present otherwise. While transmitting transducer and receiving transducer are being guided past the test specimen, it is possible to determine a spatial extent of the defect along the direction of movement of transmitting transducer and receiving transducer.

Particularly preferably, the depth of the defect is determined from the reduction of the amplitude of the sound waves received by the receiving transducer. Besides a longitudinal extent of defects within the test specimen, in particular the depth of cracks is an important variable that is intended to be recorded by the non-destructive material testing. Such cracks constitute a weakening of the material of the test specimen. In the case of very deep cracks, the test specimen is severely weakened locally. When the test specimen is used as intended, for example when a wall of a pipeline for transporting a fluid is pressurized, the material threatens to fail at the defects. With knowledge of the crack depth, until repair is carried out it is possible to appropriately adapt the loading of the test specimen, for example by decreasing the pressure within a pipeline. Until the repair is carried out, it is thus possible to avoid failure of the test specimen and possible consequential damage, for example the escape of a fluid from a pipeline.

In this case, the reduction of the amplitude of the sound waves received by the receiving transducer correlates with the crack depth. A deeper crack has the effect that a larger part of a sound wave is reflected at the crack and thus no longer passes to the receiving transducer on the envisaged sound path. The correlation between decrease in amplitude and crack depth is usually determined in advance with the aid of a reference body which is similar to the test specimen and in which correspondingly defined defects having a known extent, in particular a known depth, were introduced by machine. This correlation can be represented in the form of a characteristic curve.

It has been found surprisingly that cracks having a depth of up to 10 mm can be reliably detected in pipelines, in particular.

Particularly preferably, the transmitting transducer generates sound waves in the form of sound pulses. The signal-to-noise ratio is thereby improved. The extent of defects is determined more reliably and more accurately with such a method.

Particularly preferably, the transmitting transducer excites sound pulses in the form of a rectangular pulse or needle pulse, such that readily detectable pulses can be processed in the evaluation.

Preferably, the transmitting transducer excites sound waves at specific time intervals and/or at specific spatial positions, i.e. discretely, while the transmitting transducer and receiving transducer are guided past the test specimen. As a result, a measurement grid is produced over the test specimen, in the case of which measurements are carried out at specific points of the measurement grid. For testing a wall of a pipeline, for example, measurements could be carried out in each case at a distance of respectively one millimetre in the longitudinal direction and in the circumferential direction. The measurement grid can be adapted here depending on the required accuracy and available processing capacity or the planned feed rate. The period of time scheduled for testing the test specimen can also be taken into account here. In this regard, for example, it is also possible to carry out a measurement in the feed direction only every 2 or 3 mm.

Preferably, the transmitting transducer excites sound waves in a frequency range of between 1 MHz and 10 MHz, particularly preferably at approximately 4 MHz, i.e. 4 MHz±0.2 MHz.

In one preferred embodiment, a further receiving transducer receives the sound waves reflected at a defect. In this case, this receiving transducer is preferably arranged adjacent to the transmitting transducer. The further receiving transducer receives the parts of the sound wave that were reflected back from the defects. A crack depth can be deduced from this echo as well. While the signal received by the receiving transducer from a V-shaped through-transmission of the test specimen is particularly well suited to identifying crack depths starting from a depth of approximately 3 mm, preferably up to a depth of 10 mm, the evaluation of the echo received by means of the further receiving transducer is particularly well suited to recording crack depths up to a depth of approximately 4 mm. By means of a combination of both methods and a joint evaluation in the evaluation unit, it is thus possible to determine crack depths of defects over a very large depth range in comparison with the prior art.

The decrease in the sensitivity of the method of the V through-transmission in the case of small crack depths results from the fact that, in the case of small crack depths, a crack causes hardly any attenuation of the amplitude of the sound waves received by the receiving transducer. The signal is thus saturated. A small change in the crack depth brings about only a marginal change in the signal.

On the other hand, in the case of the echo method, based on the sound waves reflected from a defect in the direction of the transmitting transducer, in the case of very large cracks, an increase in the crack depth hardly brings about any increase in the amplitude of the reflected sound waves, of the echo. The echo signal received by the further receiving transducer is saturated in the case of large crack depths since the sound waves are already almost completely reflected.

In simulation experiments, it has furthermore surprisingly been established that the evaluation of the echo signal affords further advantages in the case of oblique cracks or grooves. In previous methods in which an angular mirror echo is measured, the amplitude thereof is greatly dependent on the inclination of the defect. In this regard, the amplitude of a signal which originates from a defect extending perpendicular to the surface of the test object (inclination angle 0°) can be greater by a multiple than the amplitude of a signal originating from a defect inclined by 10°, for example. By contrast, the amplitude of the echo signal received according to the method remains almost unchanged for inclination angles of up to ±10° and enables even obliquely extending defects to be reliably detected and determined.

In one particularly preferred embodiment, the transmitting transducer in the form of a transmitting and receiving transducer is used as further receiving transducer. As a result, the method can be carried out with less material outlay since a separate further receiving transducer can be obviated by the combination of transmitting transducer and further receiving transducer.

The use of a transmitting and receiving transducer in connection with a pulsed excitation of sound waves is particularly advantageous. In this case, the transmitting transducer excites a short sound pulse. Given a suitable thickness of the test specimen, the transmitting phase is ended when the echo, that is to say the portions of the sound pulse that are reflected at a defect in the direction of the transmitting transducer, reaches the transducer. The transmitting transducer can thus function as further receiving transducer without a superimposition with an excitation of the transmitting transducer occurring.

Particularly preferably, the crack depths are determined from the difference between the amplitudes which the receiving transducer and the further receiving transducer receive or have received. Forming the difference between the characteristic curves for the relationship between crack depth and amplitude of the sound waves respectively received generates a common characteristic curve which has a relatively uniform profile and by means of which the crack depth can be determined from the correspondingly measured amplitudes.

The correlation between crack depth and amplitude of the sound waves received by the receiving transducer and respectively between crack depth and amplitude of the sound waves reflected at the defect and received by the further receiving transducer can preferably be determined by measurements on a defined reference body with a known defect extent, in particular known defect depths, in the case of the V-shaped through-transmission and/or in the case of the echo method.

Furthermore, during an evaluation by means of the difference between the amplitudes, changes in the amplitudes which are not caused by defects and affect both the receiving transducer and the further receiving transducer equally are extracted computationally from the evaluation. With the use of the corresponding methods for inspecting walls of pipelines, for example, consideration should primarily be given to an attenuation of the amplitudes as a result of deposits on the surface of the test specimen facing the transducers. The combination of the signals makes it possible here to carry out a reliable crack depth determination independently of such deposits.

In one preferred embodiment, the sound wave excited by the transmitting transducer forms a parallel wavefront. What is achieved as a result is that the receiving transducer generates a clear and strong signal upon receiving the sound wave reflected in a V-shaped manner at the preferably outer interface of the test specimen. Particularly preferably, for this purpose, the sound waves reflected at the interface are received by a receiving transducer, the acoustic axis of which meets the acoustic axis of the transmitting transducer. The transmitting transducer and receiving transducer are thus inclined in a V-shaped manner with respect to one another in accordance with the direction of propagation of the sound waves. The acoustic axis of the transmitting transducer corresponds to the acoustic axis of the outgoing sound beam. The sound waves arriving at the receiving transducer are detected along the acoustic axis thereof.

In an alternative embodiment, the sound wave excited by the transmitting transducer forms a divergent wavefront. The sound wave reflected in a V-shaped manner at the preferably outer interface is received here in each case partly by receiving transducers which are arranged at a distance from one another in the direction of the main propagation direction of the sound wave and are in turn in each case at different distances from the transmitting transducer. A defect arranged in the sound propagation path here does not necessarily result in an attenuation of the amplitude at a receiving transducer, but rather has the effect that a corresponding amplitude can no longer be ascertained at a receiving transducer or a group of receiving transducers. The crack depth can be deduced on the basis of the information as to which receiving transducers record a corresponding fall in the amplitude or a corresponding omission of the amplitude.

In one preferred embodiment, the thickness of the test specimen is determined. The thickness determination can be effected by means of the evaluation of the time-of-flight information regarding the sound waves being transmitted through the test specimen in a V-shaped manner. Alternatively, the thickness of the test specimen can be determined by means of a dedicated ultrasonic depth sensor. For the evaluation of the signals recorded, different characteristic curves created with reference bodies having different thicknesses can be used for different thicknesses of the test specimen. As a result, the extent of defects, in particular crack depths, can be determined reliably even in the case of local deviations of the thickness of the test specimen from the assumed thickness for which a device for carrying out measurements is designed.

The invention likewise relates to a device for detecting signals based on defects in a test specimen, in particular an inspection pig for testing a pipeline. The device comprises at least one transmitting transducer and at least one receiving transducer, wherein the transmitting transducer and the receiving transducer are arranged at a distance from one another and in a manner inclined towards one another with their acoustic axes such that the signals of a V-shaped through-transmission can be received.

Such a device for detecting signals based on defects in a test specimen is known from the prior art. This involves the use of test heads having a transmitting transducer and respectively a receiving transducer, which are in contact directly on the test specimen or on a prismatic element that is directly in contact with the test specimen. What is disadvantageous here is once again possible wear on transmitting transducer and receiving transducer, or on the prismatic elements, when they are guided past the test specimen.

The disadvantages mentioned above are avoided in the case of a device according to the invention according to claim 15 by virtue of the fact that the transmitting transducer and the receiving transducer are arranged in a receptacle, wherein the receptacle is movable in the direction of the test specimen and the receptacle has a guide element, which is able to be brought into contact with the test specimen, in such a way that, in an operating position when the guide element makes contact with the test specimen, the transmitting transducer and the receiving transducer are arranged at a distance from the test specimen in the receptacle. Firstly, this prevents transmitting transducer and/or receiving transducer from coming into contact with the test specimen and possibly being damaged in the process. Secondly, by virtue of the fact that the receptacle is able to be brought in the direction of the test specimen into an operating position in which the guide element is in contact with the test specimen, it is ensured that transmitting transducer and/or receiving transducer are/is guided past the test specimen at a defined distance therefrom.

Particularly preferably, the guide element is arranged upstream of the transmitting transducer and respectively of the receiving transducer in the feed direction of the device during a test pass. This makes it possible to avoid damage to the transmitting transducer and respectively the receiving transducer if the test specimen has an irregular surface or deposits have deposited on the surface of the test specimen facing the transmitting transducer and respectively the receiving transducer. The guide element arranged upstream of the transducers in the feed direction, upon contact with an irregularity projecting from the surface of the test specimen in the direction of the transmitting transducer and respectively the receiving transducer, will cause the movable receptacle to lift off from the surface of the test specimen. In this case, together with the receptacle the transmitting transducer and respectively the receiving transducer are also lifted off from the surface and thus protected against damage. Reliable operation of the device is thus made possible. This is particularly advantageous in the case of use in the form of an inspection pig that is used over relatively long sections within a pipeline that is not accessible, or is accessible only with difficulty, from the outside.

In one preferred embodiment, the guide element is configured here as a skid. Such a skid enables the receptacle to slide along the surface of the test specimen and to lift off from if the skid encounters an obstacle. In this case, the configuration in the form of a skid largely avoids problems of catching on an obstacle that suddenly occurs on the surface of the test specimen.

Preferably, the guide element is formed by a protuberance of the receptacle projecting in the direction of the test specimen. The guide element is thus embodied integrally with the receptacle and reliably causes the receptacle to lift off from the test specimen if the surface of the test specimen has a projecting irregularity. Particularly preferably, the receptacle has a guide element arranged in front of and one arranged behind the transmitting transducer and respectively the receiving transducer. Particularly preferably, the receptacle has a circumferentially extending guide element enclosing the transmitting transducer and respectively the receiving transducer arranged in the receptacle. A circumferentially extending guide element can ensure that a short projection does not cause the receptacle to lift off from the surface of the test specimen instantaneously, wherein after passage of the guide element the receptacle is moved in the direction of the test specimen and transmitting transducer and/or receiving transducer are/is damaged by the projection if it is situated behind the guide element or between two guide elements.

Preferably, the guide element has an in particular ceramic wear pad. Since the guide element is in contact with the surface of the test specimen, a wear pad can prevent damage to the surface of the test specimen or improve the resistance of the guide element to wear. The lifetime and thus the operational reliability of the device can be improved as a result. Furthermore, the friction between test specimen and guide element can be minimized by means of a suitable choice of material for the wear pad.

In an alternative preferred embodiment, the guide element is embodied as a rotatable cylindrical body in the form of a wheel. The use of a guide element in the form of a wheel makes it possible to minimize the wear on the surface of the test specimen and/or the guide element. In this case, the guide element does not slide along the surface of the test specimen, but rather rolls thereon. Friction and wear associated therewith are largely minimized. The dependability and operational reliability of the device are thereby increased.

Preferably, the device has a restoring element that applies to the receptacle a force that moves the latter in the direction of the test specimen. Such a restoring element ensures that the receptacle or the guide element is brought into contact with the surface of the test specimen. In this case, the restoring element is embodied such that it is possible to give way vis-à-vis possibly projecting irregularities of the surface of the test specimen. Particularly preferably, the restoring element is embodied here as a spring. Alternatively, however, restoring elements are also conceivable for example as a hydraulic element or as an electric motor.

In one preferred embodiment variant, the device has a plurality of pairings of transmitting transducers and receiving transducers arranged and offset with respect to one another transversely with respect to the feed direction. By virtue of the pairings of transmitting transducer and receiving transducer being arranged offset with respect to one another transversely with respect to the feed direction, the device can scan a wider region of the test specimen during a pass. The number of passes with which the test specimen is measured can be reduced as a result. In one particularly preferred embodiment, the pairings of transmitting transducer and receiving transducer are arranged offset one behind another in the feed direction. The arrangement one behind another makes it possible to realize even relatively small offsets of the pairings of transmitting transducer and receiving transducer, in the case of which otherwise two transmitting transducers and respectively two receiving transducers would mutually impede one another on account of their structural space.

In one preferred embodiment, a transmitting transducer is assigned receiving transducers arranged at different distances from the transmitting transducer. Said receiving transducers are arranged at different points of the test specimen in order to receive sound waves emanating from the transmitting transducer. As a result, for example, the spatial resolution of the signals attributed to defects can be increased and the subsequent analysis of the data can be improved. Additionally or alternatively, the assignment of a plurality of receiving transducers to a transmitting transducer makes it possible to deduce different sound paths of a signal in the test specimen, which can be attributed for example to different thicknesses of the test specimen at different points to be tested.

Particularly preferably, the acoustic axes of transmitting transducer and receiving transducer are arranged in a common plane. This makes it possible, in particular, to use a divergent sound wave that is emitted by the transmitting transducer. In this case, the signal of the divergent sound wave at different emergence points is received by different receiving transducers. As a result, data are recorded with improved spatial information.

In one preferred embodiment, the device is embodied as an inspection pig, wherein the inspection pig has a centre longitudinal axis and a plurality of receptacles with corresponding transmitting transducers and receiving transducers are arranged in a manner distributed around the centre longitudinal axis in the circumferential direction. This makes it possible, with one pass of such an inspection pig through a test specimen in the form of a pipeline, to record signals based on defects over a plurality of points distributed on the circumference of the test specimen or pipeline. In the ideal case, the number of receptacles or transmitting and receiving transducers arranged on such an inspection pig is enough to ensure that the pipeline can be tested over the entire circumference with sufficient spatial resolution with one pass. As a result, the number of required test passes can be reduced to preferably one pass.

Furthermore, the invention encompasses an arrangement for carrying out the method according to the invention, comprising a device according to the invention and an evaluation unit for evaluating the signals recorded by the device, said signals being based on defects in a test specimen, according to the method according to the invention.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Hereinafter, identically acting elements of the invention are provided with a uniform reference sign in so far as this is practical. The features of the exemplary embodiments described below can also be subject matter of the invention in different feature combinations from those illustrated, but at least in combination with the features of an independent main claim.

Figure 1:
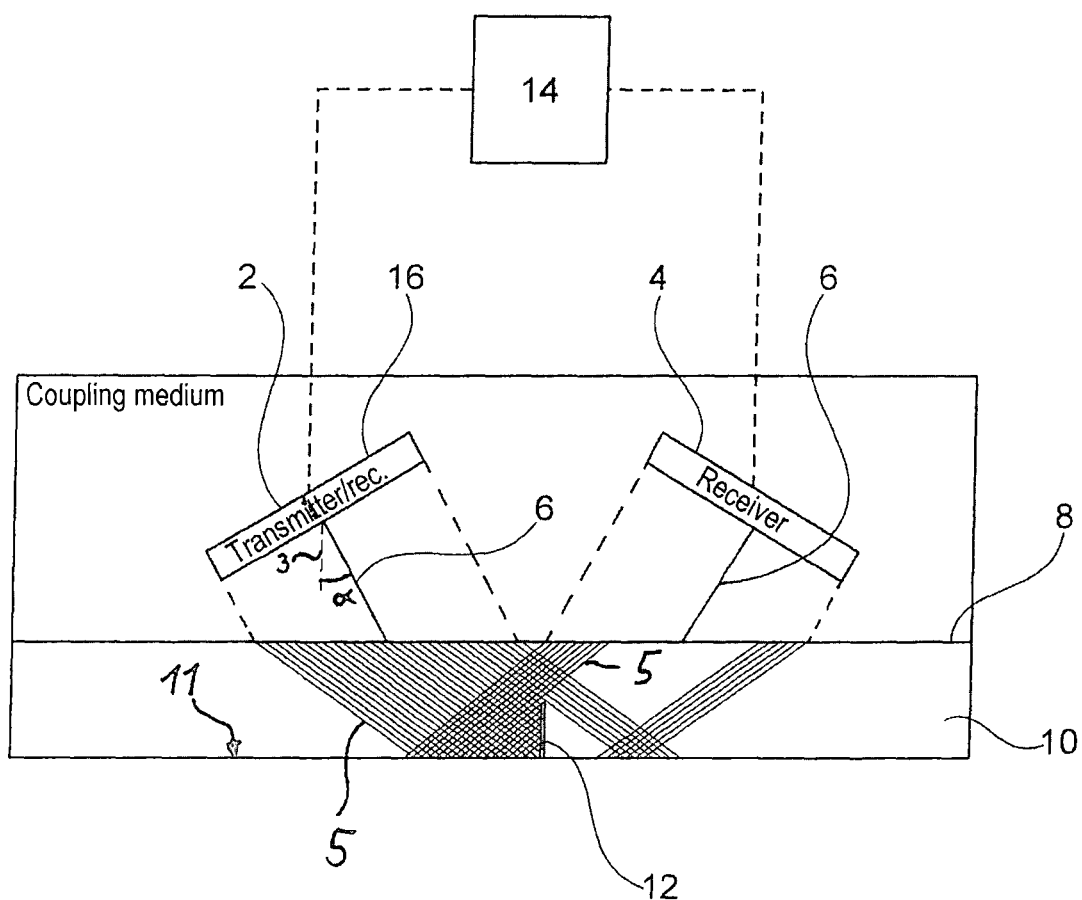
FIG. 1 shows a schematic illustration of an arrangement according to the invention.

FIG. 1 schematically shows an arrangement according to the invention for carrying out the method according to the invention with a transmitting transducer 2 and a receiving transducer 4. Transmitting transducer 2 and receiving transducer 4 are arranged at a distance from the test specimen 10. Sound waves 5 excited by the transmitting transducer 2 propagate in a coupling medium until they couple into the test specimen 10. The acoustic axis 6 of the transmitting transducer 2 forms an angle α with a normal 3 to the surface 8 of a test specimen 10, preferably a wall of a pipeline. The sound waves 5 excited by the transmitting transducer 2, upon impinging on the test specimen 10, couple into the test specimen 10 essentially at an angle β (cf. FIG. 4) and pass through said test specimen in a V-shaped manner. In this case, the sound waves 5 are reflected at an outer interface 11 of the test specimen 10. The receiving transducer 4 is oriented with its acoustic axis 6 towards the emergence point of said sound waves passing through the test specimen 10 in a V-shaped manner. The acoustic axis 6 of the receiving transducer 4 also forms an angle α with a normal 3 to the surface 8 of the test specimen 10. As is evident in FIG. 1, existence of a defect 12 within the test specimen 10 has the effect that the sound waves 5 passing through the test specimen 10 do not completely reach the receiving transducer 4. The sound waves 5 impinging on the defect 12 are at least partly reflected at the latter. As a consequence, the amplitude recorded by the receiving transducer 4 is lower. From this an evaluation unit 14 deduces computationally the extent of the defect 12, and here in particular the depth. FIG. 1 illustrates the transmitting transducer 2 in the form of a transmitting and receiving transducer. In this case, the transmitting and receiving transducer combines the transmitting transducer 2 with a further receiving transducer 16. In this case, the function of the receiving transducer 16 can be achieved solely by electronic switching of the transmitting transducer 2, such that the same hardware operates alternately as transmitting transducer and as receiving transducer. The latter receives a portion of the sound waves 5 reflected at the defect 12 as an echo signal. For this purpose, the transmitting transducer 2 excites sound waves 5 in the form of a sound pulse. Said sound pulse is preferably short enough that the transmitting transducer 2 has finished exciting the sound waves 5 when the echo of the sound waves 5 that is reflected at a defect 12 reaches the transmitting transducer 2 or the further receiving transducer 16, which are configured as one component in the present case.

Figure 2:
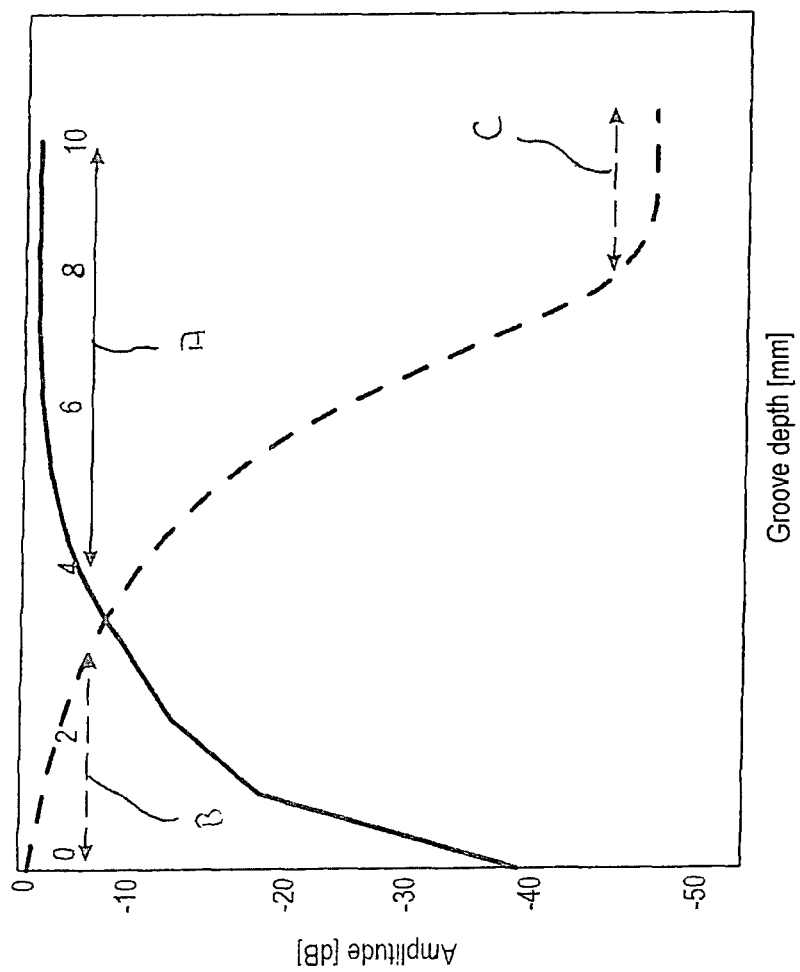
FIG. 2 shows a characteristic curve for correlation of measured amplitude and groove depth of a groove in a reference body for the signal of a V through-transmission and for a pulse echo signal.

FIG. 2 shows the profile of the amplitude recorded by the receiving transducer 4 (dashed line, V through-transmission) and respectively the further receiving transducer 16 (solid line, pulse echo operation) as a function of the depth of a defect 12 arranged in the sound path. FIG. 2 illustrates the characteristic curves for ideal defects in the form of grooves introduced into a reference body by machine and each having a known depth. It is evident that in the case of groove depths of greater than 4 mm, the amplitude recorded by the further receiving transducer 16 hardly rises as the groove depth increases. A saturation of the signal occurs here. The range of groove depths of greater than 4 mm is identified as range A. Likewise, in a range of groove depths of up to 3 mm, the amplitude of the signal of the V through-transmission recorded by the receiving transducer 4 exhibits only a small decrease in amplitude. Here, too, a saturation range is discernible (range B). A further saturation range can be seen in the case of groove depths of greater than 8 mm (range C). The reference body on which the illustration in FIG. 2 is based has a thickness of 10 mm. It can be inferred from FIG. 2 that groove depths of up to 4 mm can be determined well with the pulse echo signal recorded by means of the further receiving transducer 16. By contrast, groove depths of between 3 mm and 8 mm can be determined very well with the signal of the V through-transmission recorded by the receiving transducer 4. A combination of the two operating modes or of transmitting transducer 2, receiving transducer 4 and further receiving transducer 16 thus makes it possible to determine the crack depth in a range of 0 mm to 8 mm.

Figure 3:
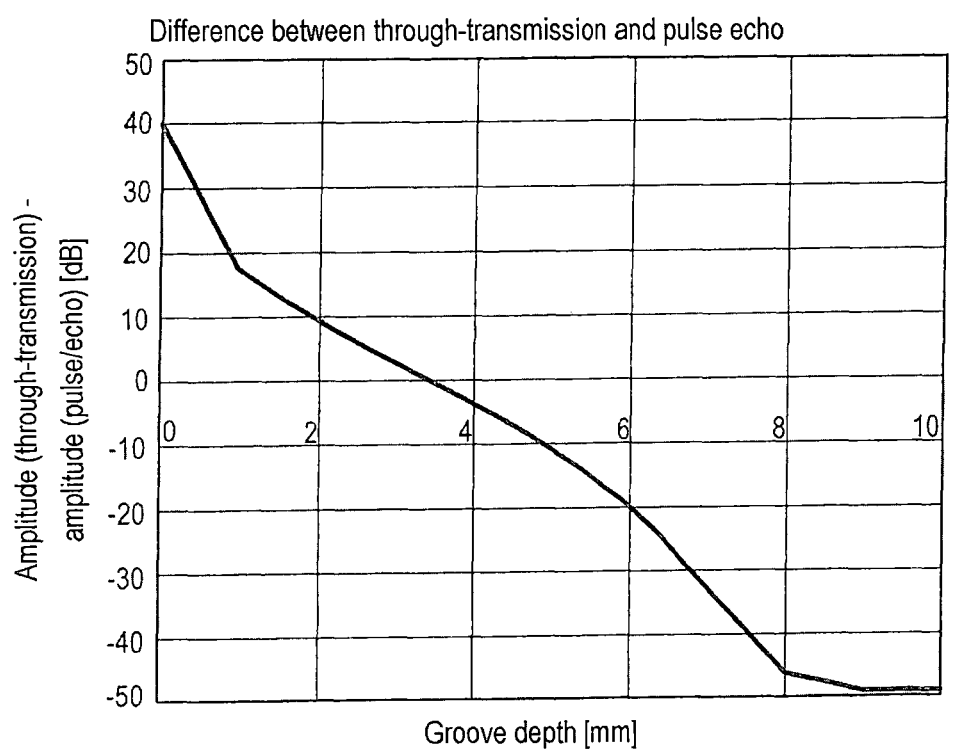
FIG. 3 shows a characteristic curve of the difference between the signals illustrated in FIG. 2 over the groove depth of a groove in a reference body.

FIG. 3 shows a difference between the amplitudes that is generated from the correlations illustrated in FIG. 2. This reveals an approximately linear relationship between groove depth and attenuation of the amplitude on a logarithmic scale up to a groove depth of 8 mm. From the use of receiving transducer 4 and further receiving transducer 16, a point on this characteristic curve can be determined from the difference between the amplitudes respectively recorded and the depth of a defect 12 can be deduced at said point. This is done in the evaluation unit 14.

Figure 4:
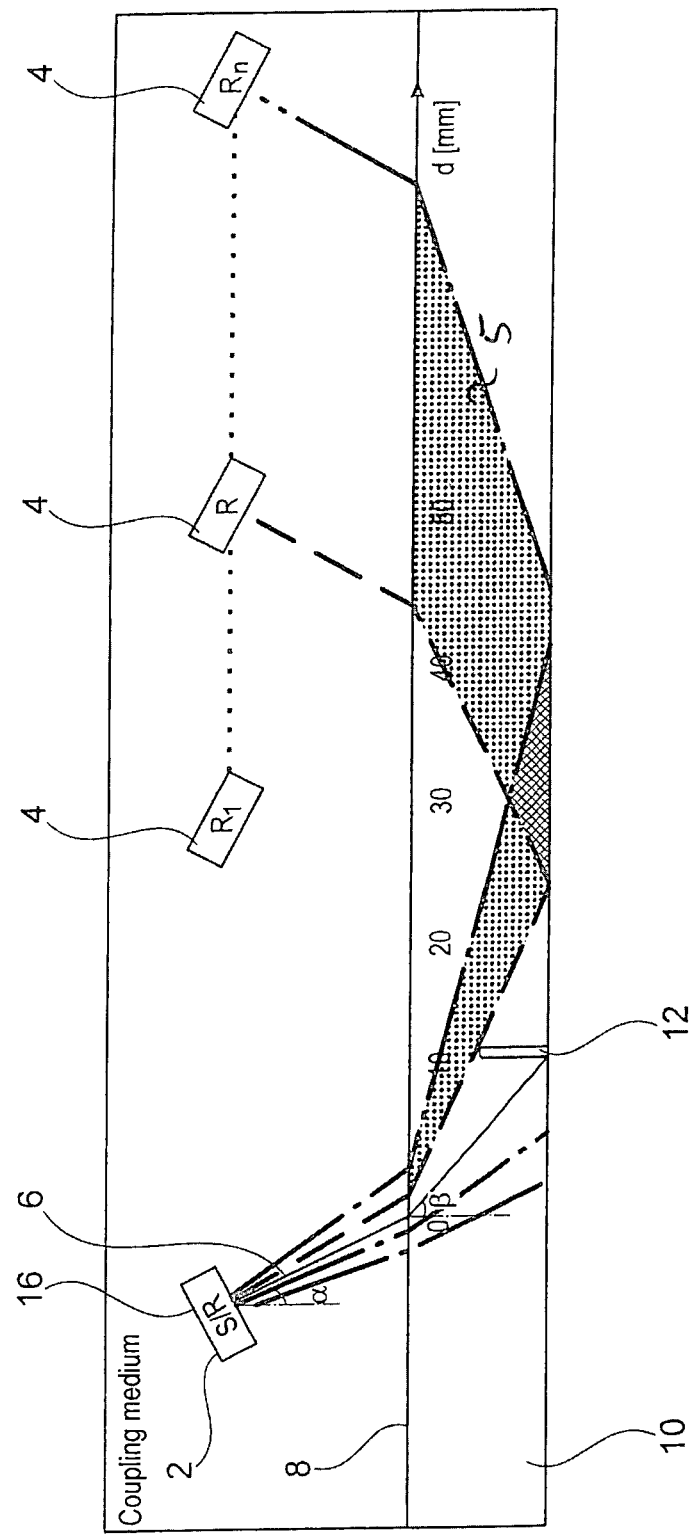
FIG. 4 shows a schematic illustration of an alternative arrangement according to the invention for use with divergent sound waves.

While FIG. 1 illustrates a transmitting transducer 2 that emits a sound wave 5 with a largely parallel wavefront, FIG. 4 shows a transmitting transducer 2 that emits a sound wave 5 with a divergent wavefront. The dashed lines indicate the limits of the resulting sound cone at which a −6 dB damping occurs in comparison with the corresponding position in the central ray, while the dash-dotted lines show the limits of a −12 dB damping. The transmitting transducer 2 is once again configured as a combined transmitting and receiving transducer that integrates the further receiving transducer 16. Likewise, the transmitting transducer 2 is once again oriented in such a way that its acoustic axis 6 forms an angle α with the normal 3 to the surface 8 of the test specimen 10. A plurality of receiving transducers 4 are arranged in FIG. 4, which are arranged at a distance from the transmitting transducer 2 in the direction of propagation of the sound waves 5 in the test specimen 10 and are in each case at a different distance from the transmitting transducer 2. A defect 12 once again brings about shading of the sound waves 5, which this time has the consequence that only specific receiving transducers 4 receive sound waves excited by the transmitting transducer 2. Transmitting transducer 2 and receiving transducer 4 are arranged at a distance from the test specimen 10. Sound waves 5 excited by the transmitting transducer 2 propagate in a coupling medium arranged between transmitting transducer 2 and test specimen 10 until they couple into the test specimen 10. Likewise, sound waves 5 coupling out of the test specimen 10 propagate via the coupling medium until they are received by a receiving transducer 4 or the further receiving transducer 16.

Figure 5:
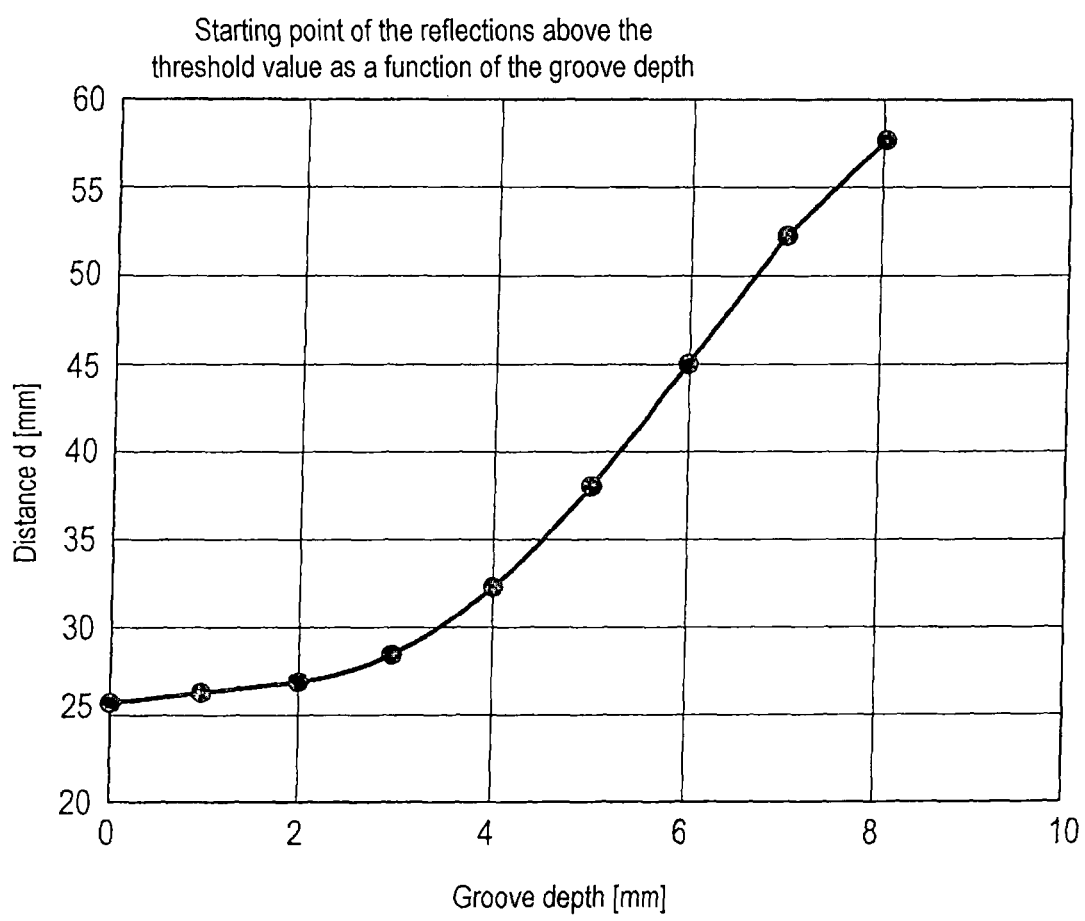
FIG. 5 shows a characteristic curve for correlation of groove depth in a reference body and position of a receiving transducer at which the measured amplitude exceeds a predefinable threshold value relative to the transmitting transducer.

FIG. 5 shows an illustration showing the groove depth in correlation with the distance between the receiving transducers 4, at which an amplitude of the sound waves 5 that exceeds a specific threshold value can be ascertained, and the transmitting transducer 2. The first receiving transducer 4 at which the predefined threshold value of the signal is exceeded is further away from the transmitting transducer 2, the deeper the defect 12. The defect depth can thus be determined on the basis of the distance between the first receiving transducer 4 at which exceedance of the threshold value is ascertained and the transmitting transducer 2.

Here, too, a saturation range up to groove depths of approximately 3 mm is manifested again, in which it is virtually impossible to determine the groove depth only using this signal. Therefore, the system according to FIG. 4 likewise supplementarily uses the information of a pulse echo signal recorded by the further receiving transducer 16 in order to be able to determine the depth of defects 12 that are less deep.

Figure 6:
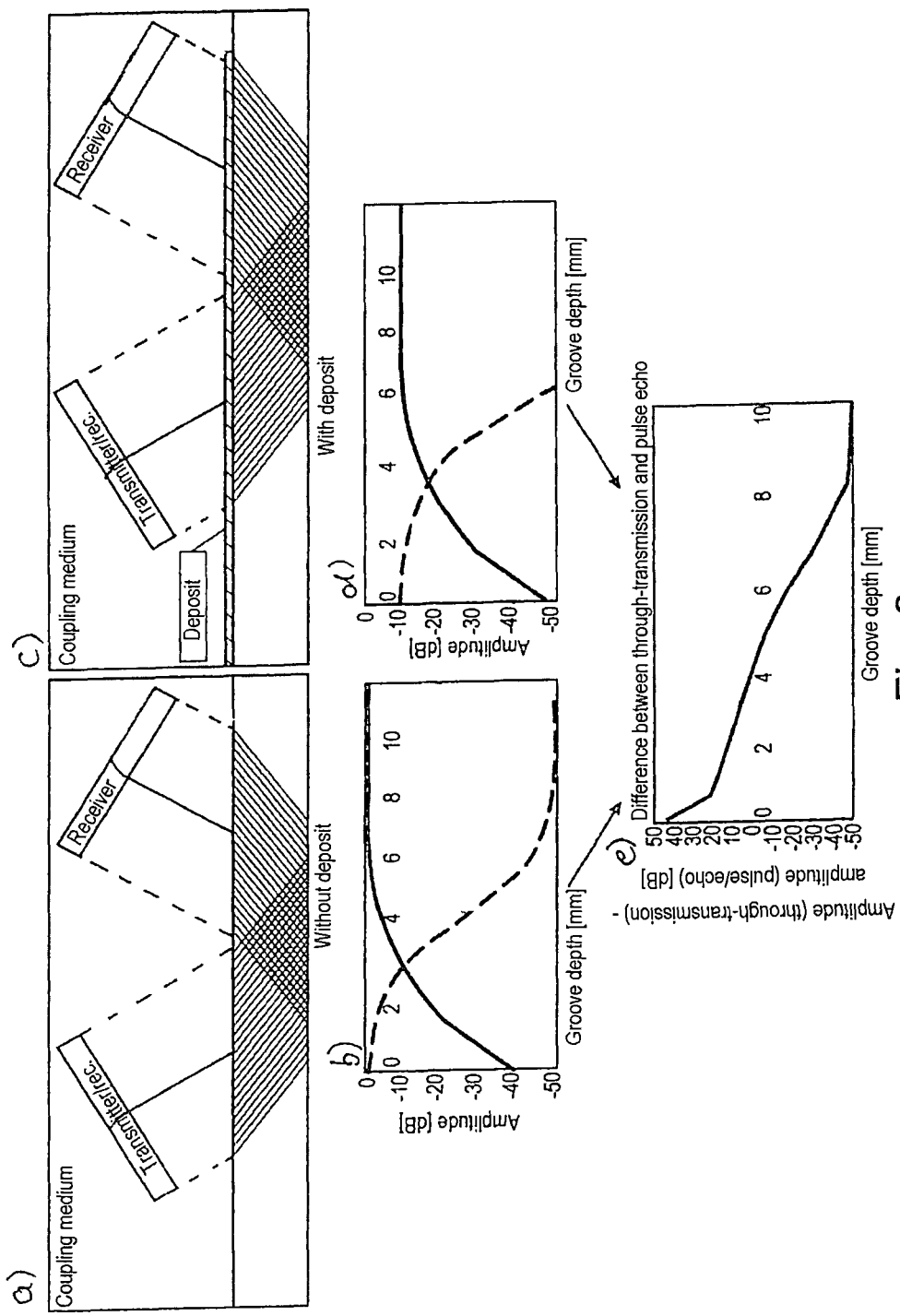
FIG. 6 shows differences between amplitudes according to FIG. 2 and FIG. 3 with and without a deposit on the test specimen.

FIG. 6 shows how the use of the difference between the amplitudes recorded by the further receiving transducer 16 (solid line, pulse echo operation) and the receiving transducer(s) 4 (dashed line, V through-transmission) can be used in order to determine the depth of defects 12 independently of deposits possibly present on the surface 8 of the test specimen 10. FIG. 6a shows a V through-transmission of a test specimen 10 without deposits. FIG. 6b shows the amplitudes recorded by the further receiving transducer 16 and the receiving transducer 4 on a reference body with grooves having different depths. In this case, the grooves are introduced by machine and the groove depths are known in each case. FIG. 6c shows a V through-transmission of a test specimen 10 with deposits arranged on the surface of the test specimen 10. The amplitudes recorded by the further receiving transducer 16 and the receiving transducer 4 are illustrated in FIG. 6d. As a result of the deposits, the amplitudes are reduced in comparison with the amplitudes in FIG. 6b without deposits, since the sound waves 5 experience an additional damping upon passing through the layer of deposits twice. FIG. 6e shows in each case the difference between the amplitudes recorded by the further receiving transducer 16 and the receiving transducer 4. The difference calculated from the amplitudes according to FIG. 6b corresponds to the difference calculated from the amplitudes according to FIG. 6d. Since a signal of the V through-transmission recorded by the receiving transducer 4 and a pulse echo signal recorded by the further receiving transducer 16 both have to pass through the layer of deposits, the attenuation of the amplitude that is caused by said deposit is extracted computationally when forming the difference between the two signals. The difference between the two signals produces in each case a characteristic curve analogous to FIG. 3, on the basis of which the groove depth can be determined reliably in an evaluation unit 14. As a result, defect depths can be determined reliably despite deposits on the test specimen 10.

Figure 7:
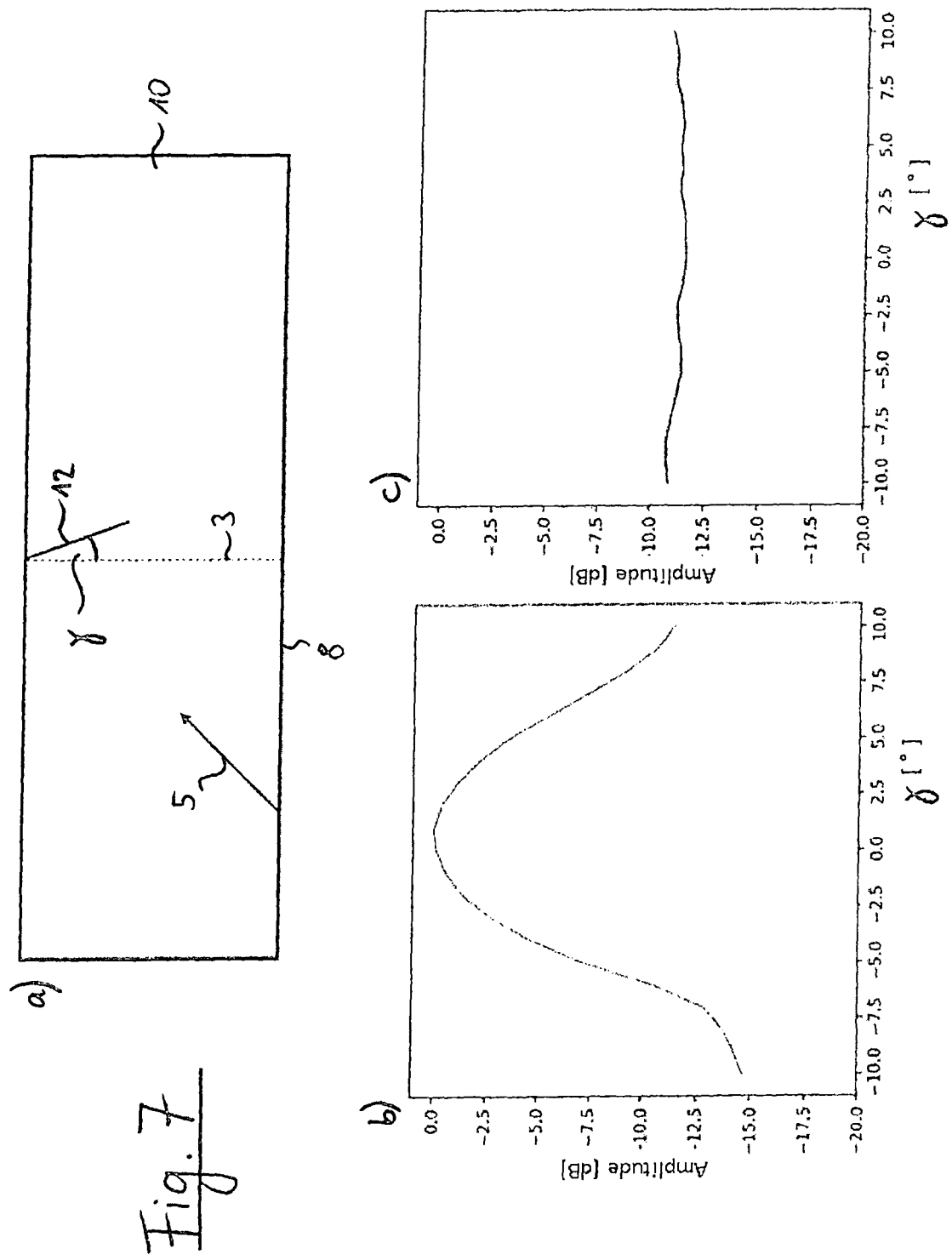
FIG. 7 shows simulation results of the amplitudes of an angular mirror echo and of a pulse echo signal upon variation of the oblique position of a groove.

FIG. 7 illustrates a further advantage of the method according to the invention in the case of oblique cracks or grooves. FIG. 7a shows a defect 12 extending obliquely in the test specimen 10, said defect forming an angle γ with a normal 3 to the surface 8 of a test specimen 10. FIGS. 7b and 7c show simulation results of the amplitudes of a conventional angular mirror echo (FIG. 7b) and of a pulse echo signal (FIG. 7c) according to the invention upon variation of the oblique position of the defect 12 by up to 10°. The amplitude of the angular mirror echo is greatly dependent on the angle γ, such that an attenuation by approximately 15 dB is already present in the case of an inclination angle of −10°, for example. By contrast, the amplitude of the pulse echo signal is almost constant in the range of −10° to +10°. Therefore, the use of the pulse echo signal ensures that even obliquely extending defects 12 are reliably detected and determined.

Figure 8:
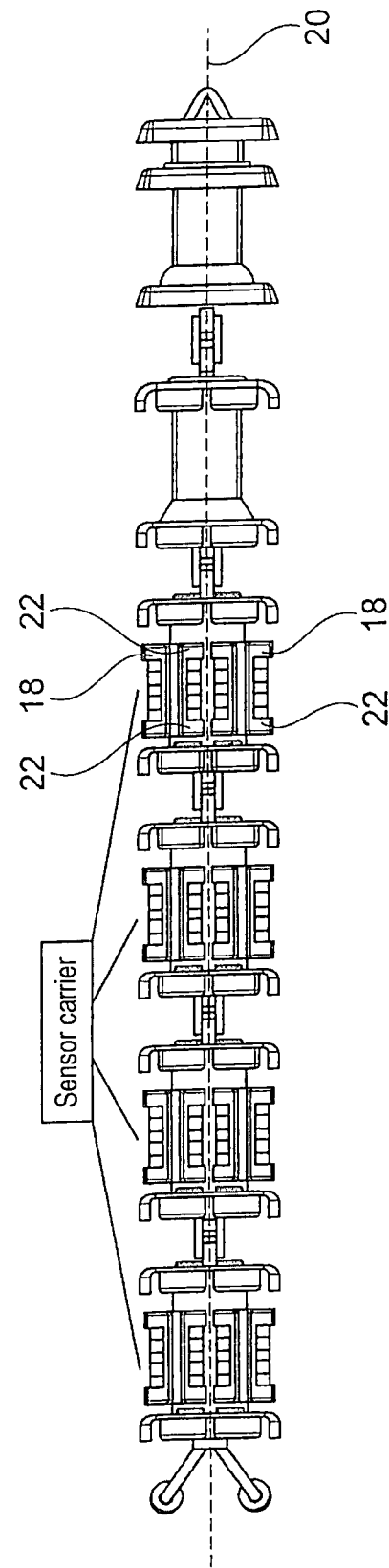
FIG. 8 shows a device for detecting signals based on defects in a test specimen in the form of an inspection pig for carrying out the method according to the invention.

FIG. 8 shows a device for detecting signals based on defects 12 in a test specimen 10 in the form of an inspection pig for testing pipelines. Transmitting transducers 2 and receiving transducers 4 here are arranged in each case in receptacles 18. The device 16 comprises, around a longitudinal centre axis 20, a multiplicity of receptacles 18 with transmitting transducers 2 and receiving transducers 4, said receptacles being arranged in a manner distributed over the circumference. In this case, the receptacles 18 are radially movable in the direction of a test specimen 10. The receptacles 18 each have at least one guide element 22, which are able to be brought into contact with the test specimen 10 and are configured in such a way that when the guide element 22 makes contact with the test specimen 10, the transmitting transducer 2 and the receiving transducer 4 are arranged at a distance from the test specimen 10 in the receptacle 18. In the present case, the receptacles 18 each have guide elements 22 arranged upstream and downstream of the transmitting transducer 2 and receiving transducer 4 in the feed direction of the device 16 within a pipeline.

Figure 9:
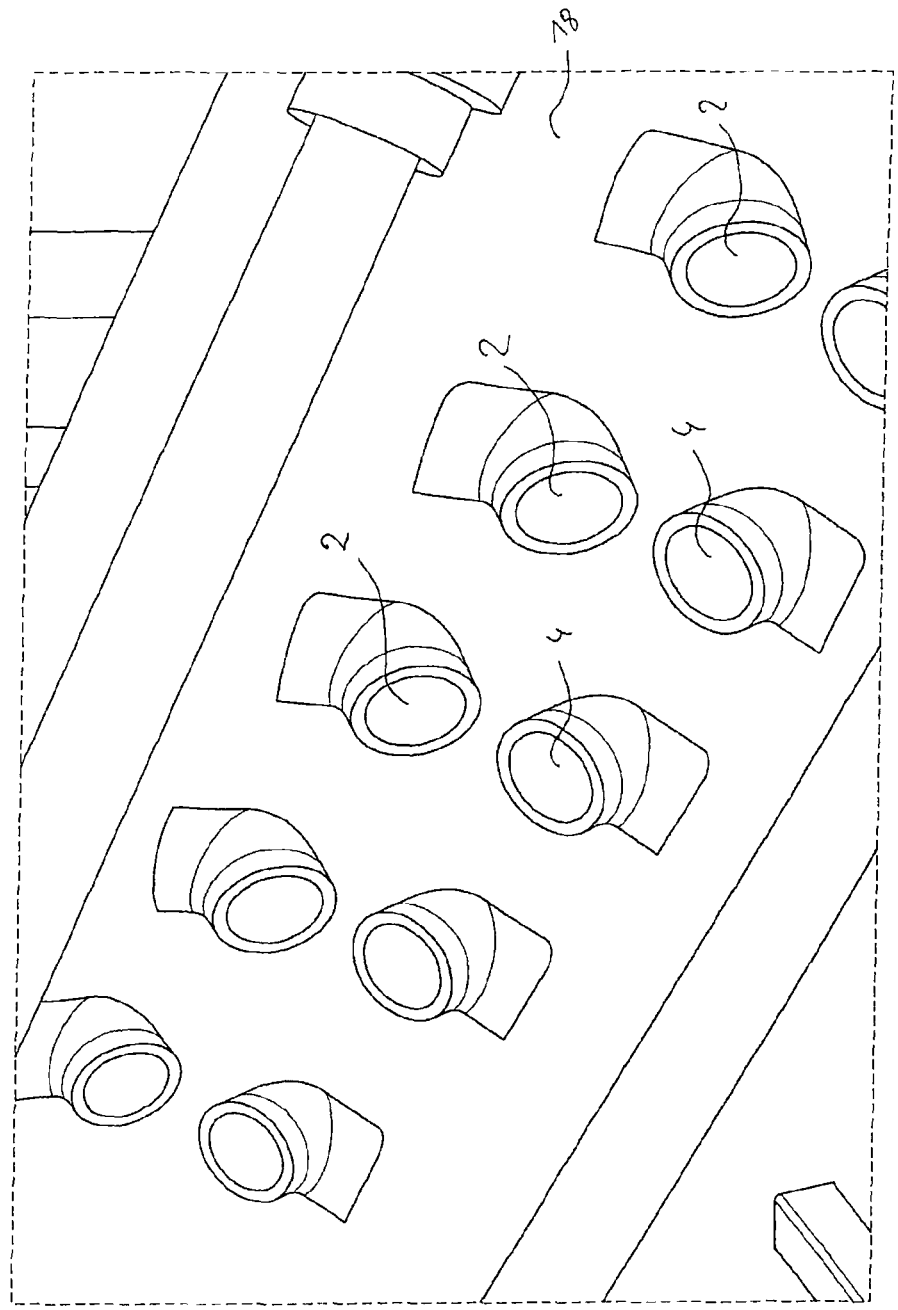
FIG. 9 shows an arrangement of transmitting transducer and receiving transducer in a receptacle of an inspection pig according to FIG. 8.

In FIG. 8, there are arranged in a receptacle 18 a plurality of pairs of transmitting transducer 2 and receiving transducer 4, which are arranged at a distance from one another in the feed direction and slightly offset with respect to one another, as is also illustrated in FIG. 9. As a result, with one pass of the device 16 through a test specimen 10 to be tested in the form of a pipeline, a large part of the circumference of the pipeline can be detected simultaneously during one pass. Such a device makes it possible to record signals based on defects 12 in a test specimen 10 in one pass.

Figure 10:
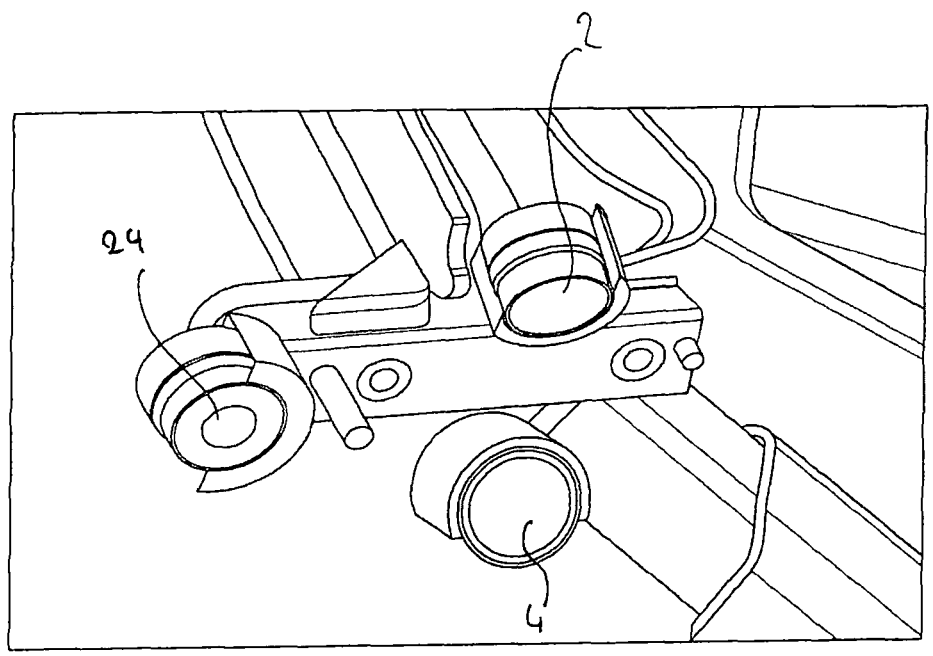
FIG. 10 shows an arrangement of transmitting transducer and receiving transducer with ultrasonic depth sensor according to a further embodiment according to the invention.

FIG. 10 shows an arrangement comprising transmitting transducer 2 and receiving transducer 4 with an ultrasonic depth sensor 24. Transmitting transducer 2 and receiving transducer 4 are arranged with their acoustic axes angled towards one another, such that a V through-transmission of a test specimen 10 can be effected. By contrast, the ultrasonic depth sensor 24 is oriented with its acoustic axis perpendicular to the surface of a test specimen 10 and can thus determine the thickness of the test specimen 10. From the thickness of the test specimen 10 or the deviation of the test specimen thickness from a nominal or assumed test specimen thickness, a correction of the signals obtained from transmitting transducer 2 and receiving transducer 4 can be carried out. This correction can be effected for example by storage of different correlations for reference bodies having different thicknesses. Such an ultrasonic depth sensor 24 can also be used in the embodiments described above.

The invention claimed is:

1. A method for determining the extent of defects in a test specimen, the method comprising the steps of:
exciting, via at least one transmitting transducer, sound waves in the ultrasonic range, causing the sound waves to propagate in the form of a sound beam, the acoustic axis of which forms an angle ($\alpha$) with a normal to a surface of the test specimen facing the transmitting transducer,
coupling the sound waves into the test specimen obliquely to reflect in a V-shaped manner at an outer interface of the test specimen,
receiving, via at least one first receiving transducer spaced apart from the transmitting transducer, the sound waves reflected at the interface of the test specimen,
determining, via an evaluation unit, an extent of a defect arranged within a sound path based on a reduction of the amplitude of the sound waves received by the first receiving transducer,
wherein the transmitting transducer and the first receiving transducer are guided past the test specimen at an at least substantially constant distance therefrom and the sound waves are coupled into the test specimen with an advance section via a liquid medium;
wherein a second receiving transducer receives sound waves reflected at a defect;
wherein the crack depth is determined from the difference between the amplitudes which the first receiving transducer and the second receiving transducer have received.

2. The method according to claim 1, wherein the crack depth is determined from the reduction of the amplitude of the sound waves received by the receiving transducers.

3. The method according to claim 1, wherein the transmitting transducer excites sound waves in the form of sound pulses.

4. The method according to claim 3, wherein the transmitting transducer excites sound pulses in the form of a rectangular pulse or needle pulse.

5. The method according to claim 3, wherein the transmitting transducer excites sound waves at specific time intervals and/or at specific spatial positions while the transmitting transducer and receiving transducers are guided past the test specimen.

6. The method according to claim 1, wherein the transmitting transducer excites sound waves in a frequency range of between 1 and 10 MHz.

7. The method according to claim 1, wherein the transmitting transducer in the form of a transmitting and receiving transducer is used as the second receiving transducer that receives the sound waves reflected at a defect.

8. The method according to claim 1, wherein the sound waves reflected at the outer interface are received by a receiving transducer, the acoustic axis of which meets the acoustic axis of the transmitting transducer.

9. The method according to claim 1, wherein the sound wave excited by the transmitting transducer forms a parallel wavefront.

10. The method according to claim 1, wherein the sound wave excited by the transmitting transducer forms a divergent wavefront and a plurality of receiving transducers spaced apart from one another and from the transmitting transducer to different extents in the direction of propagation of the sound waves in each case receive parts of the sound wave reflected at the outer boundary surface in a V-shaped manner.

11. The method according to claim 10, wherein the extent of a defect is determined on the basis of the amplitudes of the received sound waves, said amplitudes being registered by the spaced apart receiving transducers, and also known position data of the individual receiving transducers.

12. The method according to claim 1, wherein the thickness of the test specimen is determined by means of a depth sensor.

13. An arrangement for carrying out the claimed method of claim 1, the arrangement comprising a device for detecting signals based on defects in a test specimen, the device comprising:
at least one transmitting transducer;
at least a first receiving transducer and at least one second receiving transducer, wherein the transmitting transducer and the at least one first receiving transducer and the at least one second receiving transducer are arranged at a distance from one another and in a manner inclined towards one another with their acoustic axes such that through-transmission signals form a V-shape between the at least one transmitting transducer and the at least one first receiving transducer;
said evaluation unit for evaluating the signals recorded by the device;
wherein the at least one transmitting transducer, the at least one first receiving transducer, and the at least one second receiving transducer are arranged in a receptacle,
wherein the receptacle is movable in the direction of the test specimen and the receptacle has a guide element which is brought into contact with the test specimen in such a way that when the guide element makes contact with the test specimen, the transmitting transducer, the at least one first receiving transducer and the at least one second receiving transducer are arranged at a distance from the test specimen in the receptacle;
wherein the device has a plurality of pairings of transmitting transducers, and first receiving transducers, and second receiving transducers arranged offset with respect to one another transversely with respect to the feed direction and one behind another in the feed direction in a common receptacle.

14. The arrangement according to claim 13, wherein the guide element is arranged upstream of the transmitting transducer and the receiving transducers in the feed direction.

15. The arrangement according to claim 13, wherein the guide element is configured in the form of a skid.

16. The arrangement according to claim 13, wherein the guide element is formed by a projection of the receptacle projecting in the direction of the test specimen.

17. The arrangement according to claim 13, wherein the guide element has a ceramic wear pad.

18. The arrangement according to claim 13, wherein the guide element is configured as a wheel.

19. The arrangement according to claim 13, wherein the device has a restoring element that applies to the receptacle a force that moves the latter in the direction of the test specimen.

20. The arrangement according to claim 13, wherein a transmitting transducer is assigned receiving transducers arranged at different distances from the transmitting transducer.

21. The arrangement according to claim 20, wherein the acoustic axes of transmitting transducer and receiving transducers are arranged in a common plane.

22. The arrangement according to claim 13, wherein the device is embodied as an inspection pig having a center longitudinal axis and having a plurality of receptacles distributed around the center longitudinal axis in the circumferential direction.

\* \* \* \* \*